United States Patent [19]

Dowe et al.

[11] Patent Number: 5,534,961
[45] Date of Patent: Jul. 9, 1996

[54] BELT DRIVE SHUTTER DEVICE

[75] Inventors: David R. Dowe, Holley; Richard E. Albrecht, Honeoye Falls, both of N.Y.

[73] Assignee: Eastman Kodak Company, Rochester, N.Y.

[21] Appl. No.: 238,114

[22] Filed: May 4, 1994

[51] Int. Cl.[6] ........................................... G03B 9/22
[52] U.S. Cl. ............................................. 354/264
[58] Field of Search ................................. 354/261, 264, 354/265, 274; 474/133, 134

[56] References Cited

U.S. PATENT DOCUMENTS

| | | | |
|---|---|---|---|
| 778,334 | 12/1904 | Ricketts . | |
| 2,917,982 | 12/1959 | Martin | 95/62 |
| 2,969,142 | 1/1961 | Mack . | |
| 3,433,142 | 3/1969 | King . | |
| 3,592,116 | 7/1971 | Ritze | 95/64 R |
| 3,665,069 | 5/1972 | Richmond | 264/219 |
| 3,813,197 | 5/1974 | Ray et al. | 425/111 |
| 3,980,407 | 9/1976 | Hill | 355/71 |
| 4,199,247 | 4/1980 | Schwarz . | |
| 4,204,758 | 5/1980 | Haynes | 354/152 |
| 4,531,820 | 7/1985 | Petersen | 354/234.1 |
| 4,558,937 | 12/1985 | Petersen et al. | 354/234.1 |

FOREIGN PATENT DOCUMENTS

| | | | |
|---|---|---|---|
| 35100 | 5/1885 | Germany . | |
| 6-180465 | 6/1994 | Japan | G03B 7/00 |

OTHER PUBLICATIONS

DataBase WPI, Section PQ, Week 8931, Derwent Publications Ltd., London, GB; AN 89–226164 & SU–A–1 437 826 (Belorussian Poly), 15 Nov. 1988, abstract.

DataBase WPI, Section PQ, Week 8704, Derwent Publications Ltd., London, GB, AN 87–028529, & SU–A–1 236 414 (Belorussian Poly), 7 Jun. 1986, abstract.

*Primary Examiner*—Michael L. Gellner
*Assistant Examiner*—Daniel Chapik
*Attorney, Agent, or Firm*—Ronald M. Reichman; David A. Howley

[57] ABSTRACT

A coupling device for controlling the shutter blades of a leaf type shutter. The coupling device includes two or more hubs that are each coupled to a shutter blade and a portion of a base and a continuous belt that is in contact with the hubs so that when the hubs rotate in a first direction the shutter blades will open and when the hubs rotate in a second direction the shutter blades will close.

17 Claims, 13 Drawing Sheets

BELT DRIVE SHUTTER DEVICE

FIELD OF THE INVENTION

The invention relates generally to the field of photography, and particularly to a coupling mechanism for the individual blades of a leaf type camera shutter.

BACKGROUND OF THE INVENTION

Leaf type or blade type mechanical shutters have been used to regulate the amount of light that is going to reach the imaging areas of a filmstrip contained within a camera. Typically, the leaf type of shutter is an array of metal "blades" that are pivoted so that they all swing towards or away from the lens aperture of the camera. When the shutter is closed, all the blades are overlapping in the center of the lens aperture and no light reaches the filmstrip. To open the shutter, the blades pivot away from the center of the aperture, so that light may pass through the aperture and expose the filmstrip. Sometimes leaf type mechanical shutters may have one or more blades, each of which may have a different diameter opening. When a picture is taken the blade or blades swing away from the center of the lens aperture so that light may pass through the aperture, through the blade or blade openings to expose the filmstrip. If a picture is not being taken, the shutter will be closed. The power to open and close the leaf type mechanical shutters is provided by a spring or springs that are under tension and the timing is controlled by a watch-type gear train.

Electromagnetic actuated leaf type shutters have been developed to reduce the amount of energy that is required to open and close leaf type mechanical shutters. Electromagnetic shutters are faster than mechanical shutters from 4 mm diameter to 20 mm diameter aperture openings and electromagnetic shutters may be controlled with greater accuracy than mechanical shutters. Thus, electromagnetic shutters have higher performance characteristics, than leaf type mechanical shutters.

A typical two blade leaf style shutter may use gearing to actuate the two blades, or one blade could have a pin, while the other blade has a slot for their actuation. Shutters with more than two blades typically have a synchronizing mechanism that actuate all the shutter blades at the same time. Gearing or pins in slots, that are connected to the shutter blades and the synchronizing mechanism, may be used to interface the synchronizing mechanism to the shutter blades.

The inertia of the shutter mechanism is based upon the inertia's of the individual components of the shutter. Synchronizing rings that use gearing, have to be made sufficiently thick to ensure that the gears will always mate properly.

Synchronizing rings incorporating pins in slots have to be made sufficiently thick to allow for the pin to be held straight and rigid.

Even though the thickness and inertia of the synchronizing ring may be decreased, the synchronizing ring will still exhibit sliding friction, which degrades the performance of the shutter.

The three factors that affect a shutters performance are: clearance; inertia; and friction between individual components. The clearance of a shutter refers to gear backlash or extra space in the slot of a shutter blade that is used to prevent binding of the mating components. The inertia of a shutter refers to the relationship of the mass and velocity of the individual shutter components. The friction of a shutter refers to a force that opposes movement of two bodies that are in contact.

The problem with gearing in shutters is gear backlash. Gear backlash allows the gears to over rotate in the opening direction when the coupling mechanism i.e., synchronization gear is attempting to close the shutter. Gear backlash also allows the gears to over rotate in the closing direction when the coupling mechanism i.e., synchronization gear is attempting to open the shutter. Thus, the shutter blades over shoot the aperture and cause inaccurate exposures.

When pins are placed in the slots of shutter blades, the slots have built in clearance to prevent binding of the pin in the slot of the shutter blade. The clearance provided to prevent binding, has the same effect as gear backlash. The pins in the slots of the shutter blades over rotate in the opening direction while the coupling mechanism i.e. synchronization is attempting to close the shutter blades. The aforementioned gearing and pins in the shutter blades slots, reduce the control the control mechanism has on the shutter.

SUMMARY OF THE INVENTION

The present invention overcomes the disadvantages of the prior art by providing a coupling device for controlling the shutter blades of a leaf type shutter. The shutter blades are positioned in the proximity of a base and are actuated by an actuating mechanism. Two or more hubs are each individual coupled to one of the shutter blades and each roll on a different portion of the base. The hubs are coupled to each other so that when one of the hubs rolls along a portion of the base and moves one of the shutter blades, the remaining hubs move the remaining shutter blades.

ADVANTAGEOUS EFFECTS OF THE INVENTION

One of the advantages of this invention is that the belt drive that actuates the shutter blades is extremely thin, thus reducing the inertia of the coupling mechanism. The reduction in inertia of the coupling mechanism allows the shutter blades to respond to opening or closing quicker, because less force is required to move the shutter blades.

Another advantage of this invention is that the belt is physically connected to a hub which is connected to a shutter blade which prevents slippage of the belt.

Another advantageous effect of this invention is that the belt is attached to the shutter blades in such a way as to eliminate clearance and backlash problems.

Another advantageous effect of this invention is that the belt drive also exhibits rolling friction. Rolling friction is a force which opposes the motion of any body which is rolling over the surface of an other and sliding friction is a force which is caused by the rubbing of bodies in sliding contact. Rolling friction is preferable to sliding friction because less force is required.

Another advantageous effect of this invention is that the belt may be used in conjunction with the hubs to close the shutter blades, since the belt is in tension.

The foregoing is accomplished by providing a coupling device for controlling the shutter blades of a leaf type shutter, that are positioned in the proximity of a base and actuated by an actuating mechanism, said device characterized by: one or more hubs that is each individual coupled to one of the shutter blades, each of said hubs rolls on a different portion of the base; and means for coupling said hubs to the shutter blade so that when one of said hubs rolls along a portion of the base and moves one of the shutter blades, said remaining hubs move the remaining shutter blades.

DETAILED DESCRIPTION OF THE PREFERRED EMBODIMENT

Figure 1:
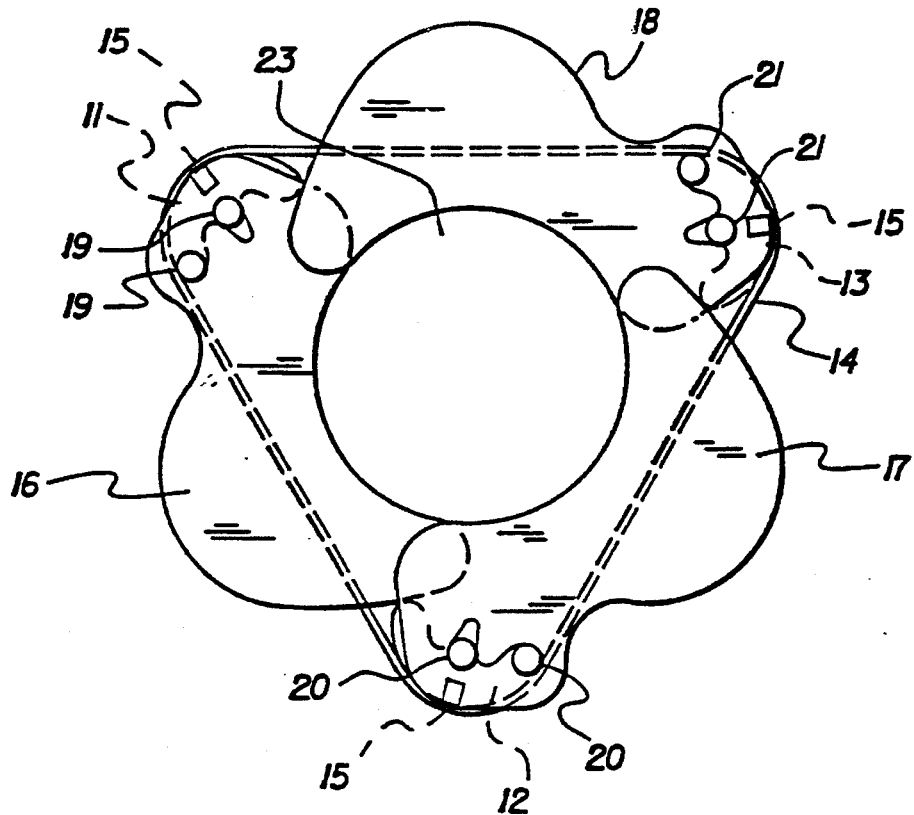
FIG. 1 is a drawing of a top view of a three bladed shutter in the full open position.

Referring now to the drawings in detail, and more particularly to FIG. 1, the reference characters 11, 12 and 13 respectively represent hubs that are positioned on the inside of a continuous belt 14. Hubs 11, 12 and 13 are spaced equidistant from each other forcing belt 14 to form a triangular shape. Belt 14 is respectively attached to hubs 11, 12 and 13 by any known means i.e., heat sealing, stapling, riveting, gluing, pinning, etc. For instance, belt 14 is shown attached to the center of hubs 11, 12 and 13 by pins 15. Shutter blade 16 is connected to hub 11 by locating pins 19 and shutter blade 17 is connected to hub 12 by locating pins 20. Shutter blade 18 is connected to hub 13 by locating pins 21. Shutter blades 16, 17 and 18 are shown in the full open position so that light may enter aperture 23. No relative movement is allowed between each hub and its attached shutter blade.

Figure 2:
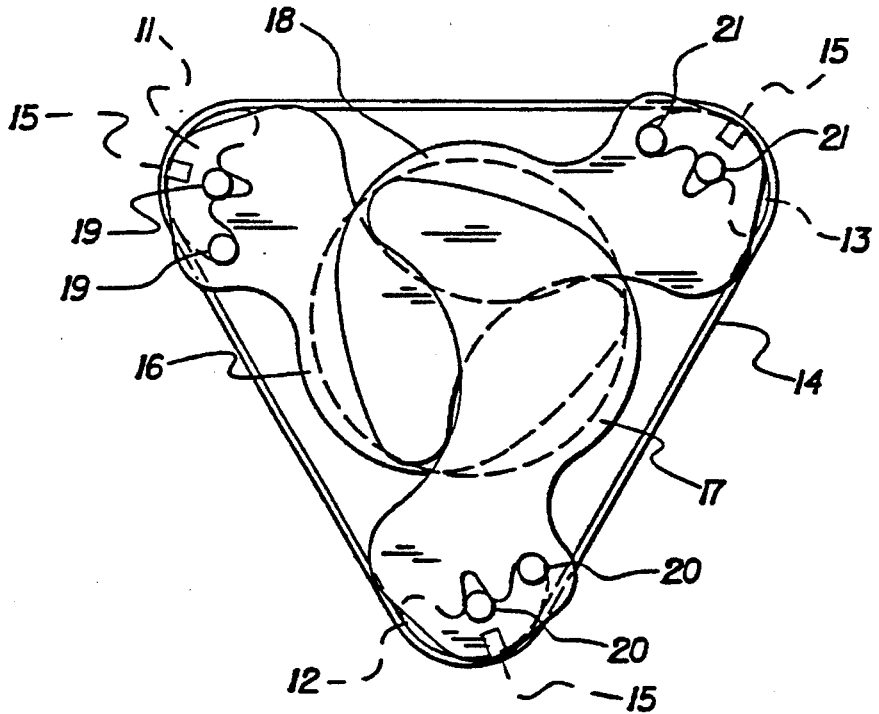
FIG. 2 is a drawing of a top view of the drawing shown in FIG. 1 when the three shutter blades are in the fully closed position.

FIG. 2 is a drawing of the figure shown in FIG. 1 when shutter blades 16, 17 and 18 are in the fully closed position so that light will be prevented from entering aperture 23.

Figure 3:
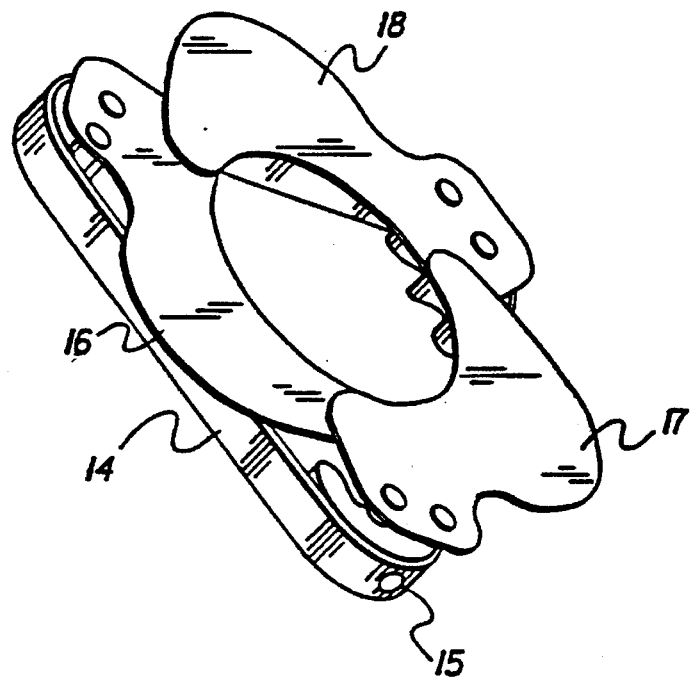
FIG. 3 is a perspective drawing of the device shown in FIG. 1.

FIG. 3 is a perspective drawing of the device shown in FIG. 1 showing shutter blades 16, 17 and 18 in the fully open position.

Figure 4:
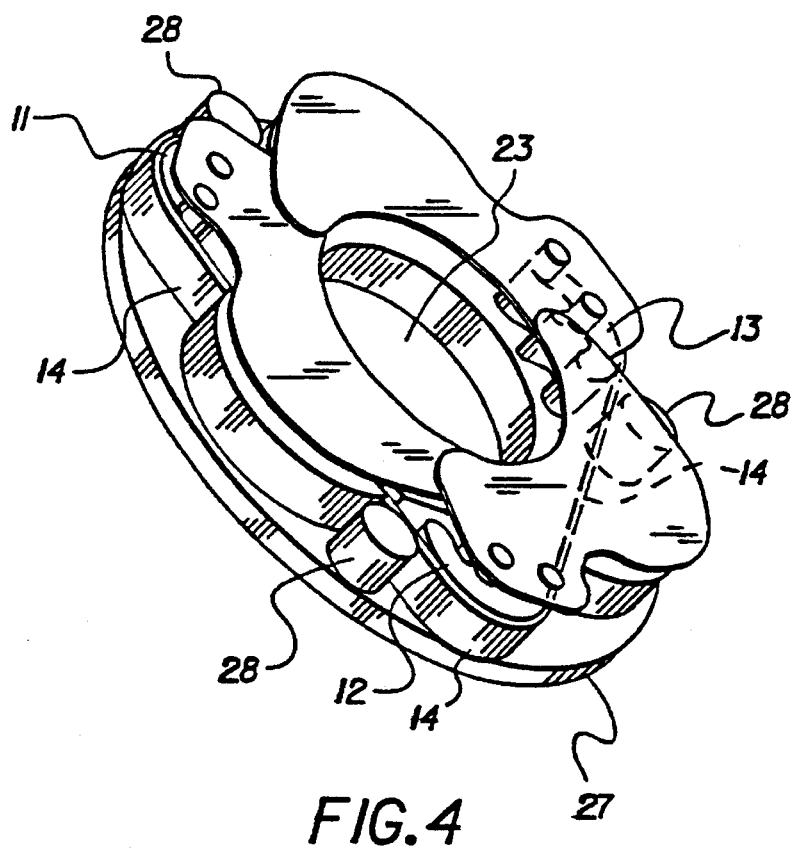
FIG. 4 is a perspective drawing of the device shown in FIG. 1 with the base shown to illustrate the assembled state of the shutter.

FIG. 4 is a perspective drawing of the device shown in FIG. 1 with a base 27 added to illustrate the assembled state of the shutter. Hubs 11, 12 and 13 rest on base 27. Base 27 has mounting pins 28 attached thereto.

Figure 5:
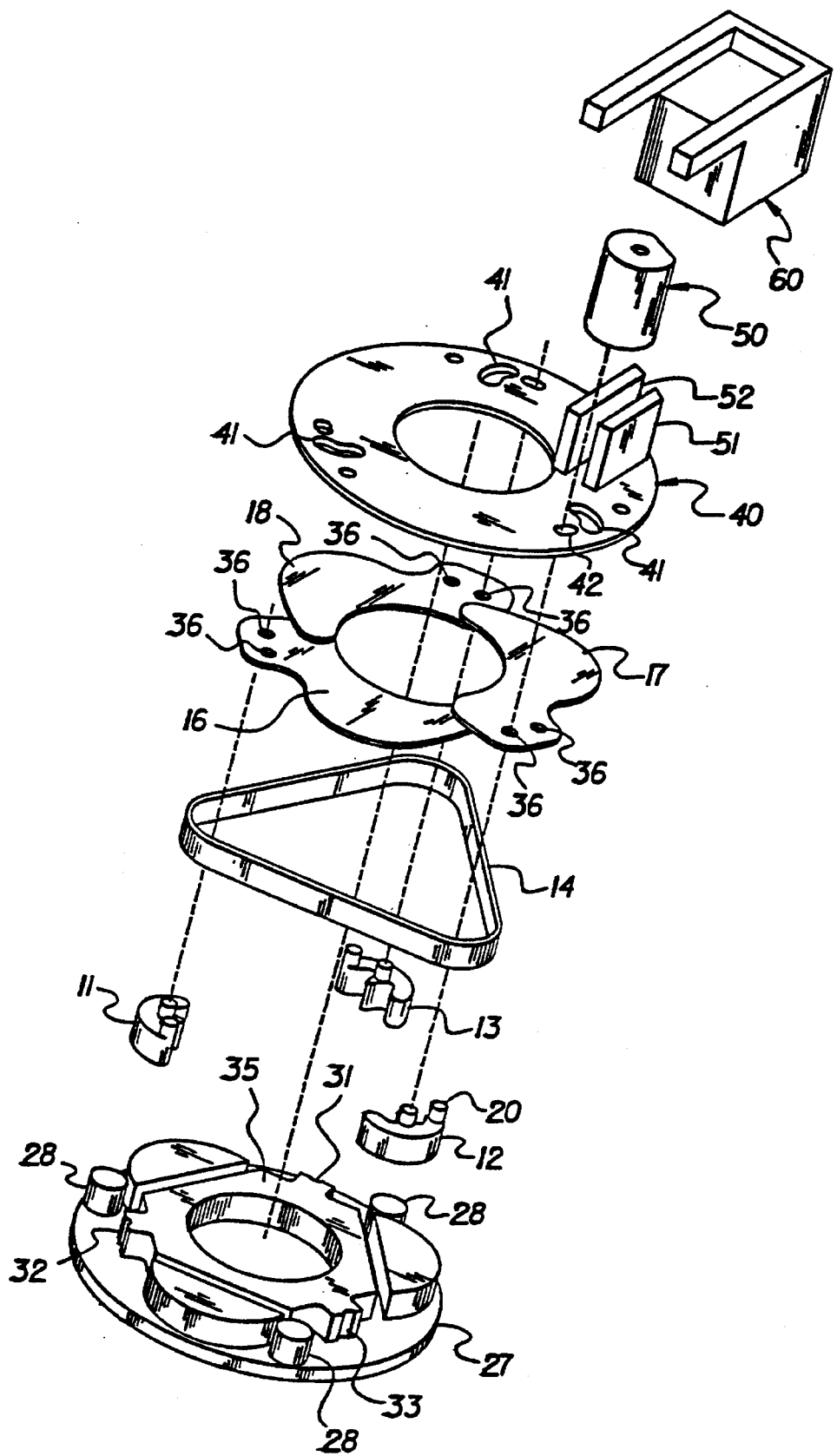
FIG. 5 is a exploded perspective drawing of the apparatus of this invention.

FIG. 5 is an exploded perspective drawing of the apparatus of this invention illustrating how the invention is assembled. Base 27 has raised portions 31, 32 and 33 which are spaced near the periphery of base 27 equidistant from each other. Base 27 also has a raised portion 35 which surrounds the center of base 27. Hubs 11, 12 and 13 are respectively connected to belt 14 by any known means i.e. gluing, riveting, pinning, etc. Hubs 11, 12, and 13 are located on the base by portions 31, 32, and 33. Hubs 11, 12 and 13, belt 14 and base 27 will supply tension to belt 14 by forcing hubs 11, 12 and 13 outward. Shutter blade 16, 17 and 18 have holes 36. Pins 19, 20 and 21 (shown in FIG. 1) are placed in holes 36 to respectively connect shutter blades 16, 17 and 18 to hubs 11, 12 and 13. Cover 40 has holes 41 equidistantly positioned along its periphery so that mounting pins 28 may be inserted in holes 41. Cover 40 also has a hole 42 near its periphery. Pin 20 (shown in FIG. 1) may be inserted in hole 42 and magnet 50 will be held in place by pin 20. Magnet 50 is oriented in a manner that it will operate shutter blades 16, 17 and 18. Walls 51 and 52 are also connected to cover 40. An armature 60 is connected to walls 51 and 52.

When a picture is taken and shutter blades 16, 17 and 18 are activated, current is forced through the coil of armature 60 which influences magnet 50 to rotate about its center. This in turn causes hub 12 to which magnet 50 is attached to also turn. Hub 12 is connected to hubs 11 and 13 by a belt and when hub 12 turns, hubs 11 and 13 also turn a like amount. It will be obvious to one skilled in the art that magnet 50 may be replaced with a motor, spring, etc. to actuate shutter blades 16, 17 and 18.

Figure 6A:
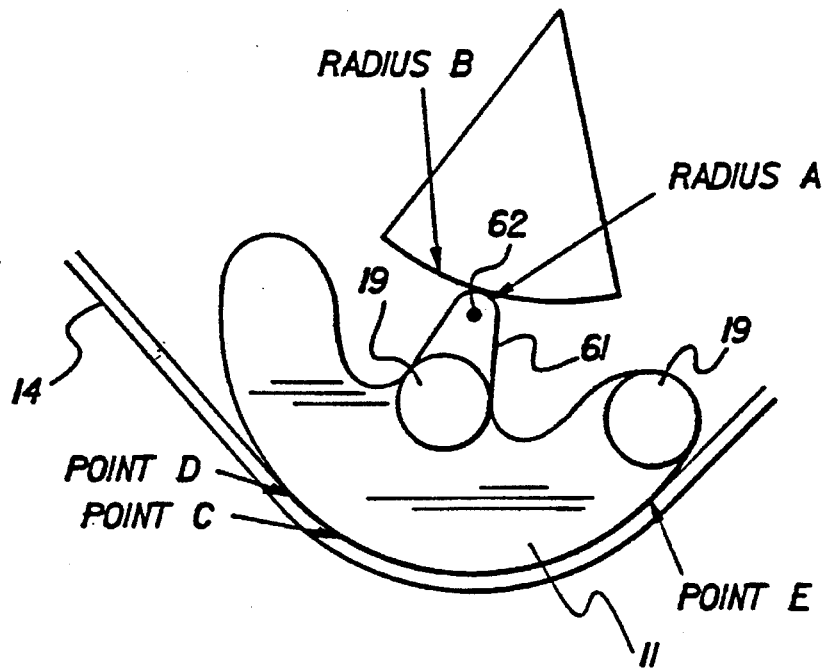
FIG. 6A is a drawing of a hub when a shutter blade of FIG. 1 is in the open position.

FIG. 6A is a drawing of a hub when a shutter blade of FIG. 1 is in the open position. Hub 11 has a proturbance 61 near its center and a center point 62. Radius A is the radius of protrubance 61. Radius B is the radius of portion 35 of base 27 (shown in FIG. 5) In FIG. 6B, line 65 passes through center point 62. Line 65 is the radius of travel of protrubance 61 and represents the arc or distance that center point 62 of radius of protrubance travels. Point C indicates the point that pin 15 (shown in FIG. 1) attaches belt 14 to hub 11. Point D and point E represent the two points that belt 14 forms a tangent with hub 11.

Hub 11 will rotate and travel about radius B. Point C will never pass the tangent points D and E where belt 14 is always in intimate contact with hub 11. Belt 14 wraps 120 degrees around hub 11 and hub 11 rotates approximately 30 degrees. When hub 11 rotates, a portion of belt 14 will be unwrapped from hub 11 and an equal portion of belt 14 will be wrapped around hub 11. Thus, as hub 11 rotates, belt 14 is always wrapped 120 degrees around hub 11. Belt 14 will always have contact with hub 11 for a specific 90 degrees. Hub 11 rotates 30 degrees in one direction which will open shutter blades 16, 17 and 18 and rotates 30 degrees in the opposite direction which will close shutter blades 16, 17 and 18.

The foregoing allows belt 14 to be physically attached to hub 11 by pin 15 (FIG. 1) or any other known means, since a certain portion of belt 14 is not moving relative to hub 11. Hence, belt 14 will not slip on hub 11. Therefore, when one hub moves a shutter blade, all of the remaining shutter blades connected to the remaining hubs will also move.

Protrubance 65 will roll along radius B of portion 35 of base 27 (FIG. 5) to open or close shutter blades 16, 17 and 18. As hub 11 is rolling about radius B, shutter blades 16, 17 and 18 are opening or closing depending on the direction of rolling. As magnet 50 is induced to rotate, the hub that it is attached to rolls along its mating surface. This rolling action has a frictional element known as rolling friction. Rolling friction is also known to be significantly less than sliding friction which would be encountered if a synchronization ring was used instead of belt 14.

Figure 6B:
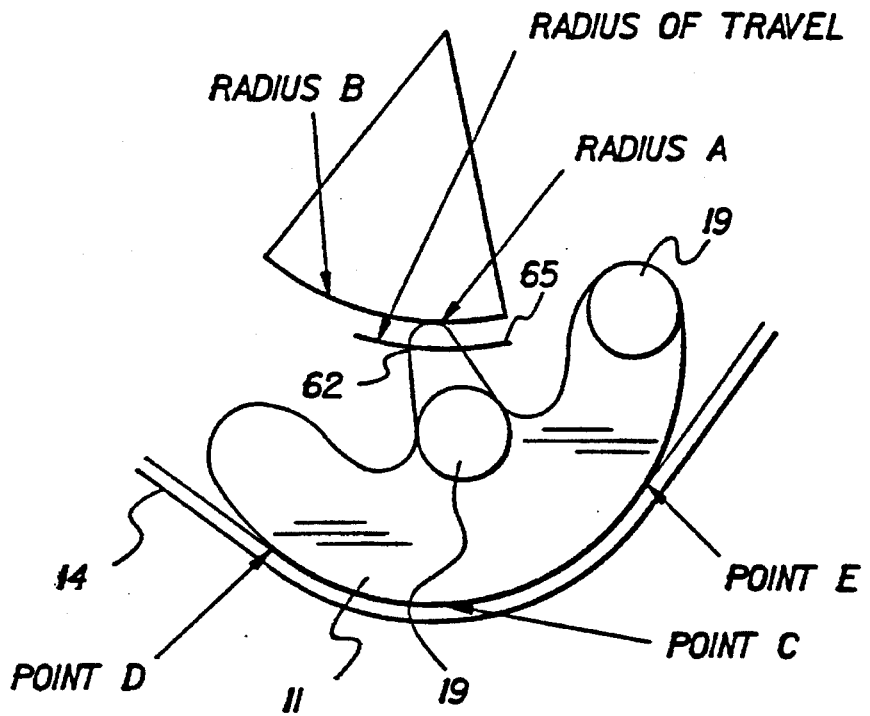
FIG. 6B is a drawing of a hub when a shutter blade of FIG. 2 is in the closed position.

FIG. 6B is a drawing of a hub when a shutter blade of FIG. 2 is in the closed position. FIG. 6B illustrates that point D and point E will move approximately 30 degrees from their location in FIG. 6A.

Figure 7:
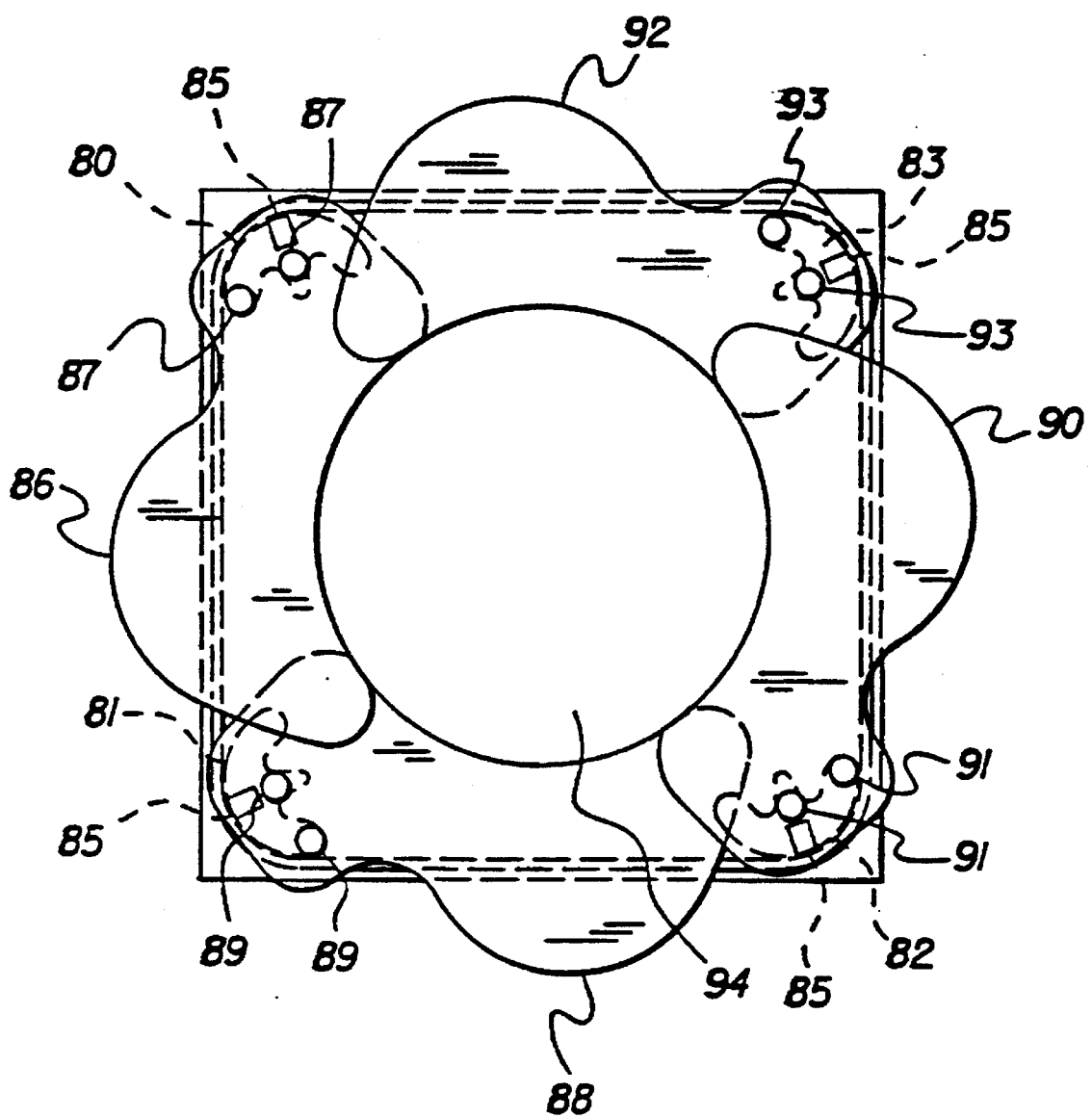
FIG. 7 is a drawing of an alternate embodiment of this invention.

FIG. 7 is a drawing of an alternate embodiment of this invention. Hubs 80, 81, 82 and 83 are positioned on the inside of a continuous belt 84. Hubs 80, 81, 82 and 83 are spaced equidistant from each other forcing belt 84 to form a square shape. Belt 84 is respectively attached to hubs 80, 81, 82 and 83 by any known means i.e., heat sealing, stapling, riveting, gluing, pinning, etc. For instance, belt 84 is shown attached to the center of hubs 80, 81, 82 and 83 by pins 85. Shutter blade 86 is connected to hub 80 by locating pins 87 and shutter blade 88 is connected to hub 81 by locating pins 89. Shutter blade 90 is connected to hub 82 by locating pins 91 and shutter blade 92 is connected to hub 83 by locating pins 93. Shutter blades 86, 88, 90 and 92 are shown in the full open position so that light may enter aperture 94.

Figure 8:
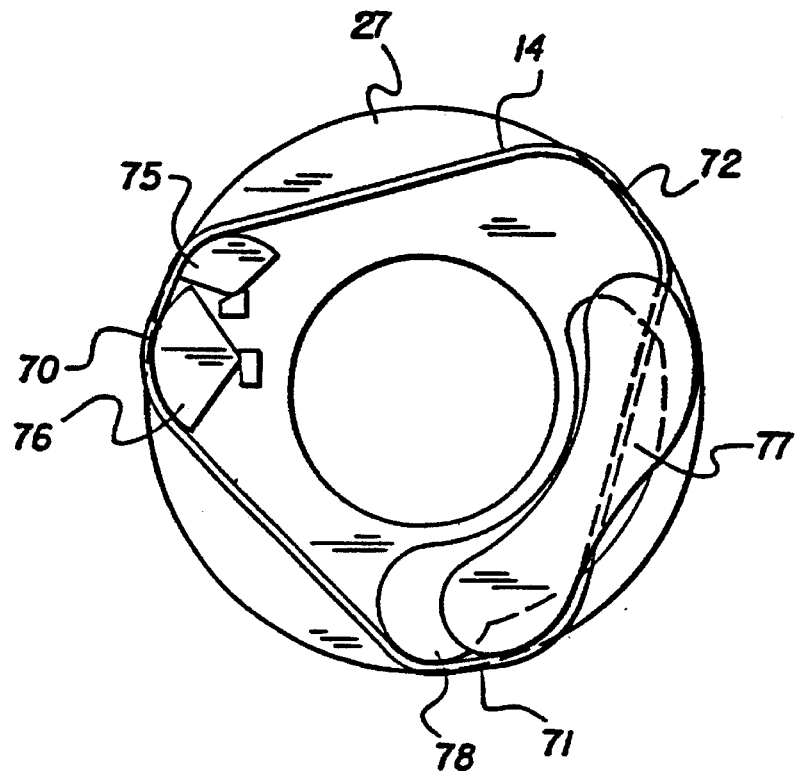
FIG. 8 is a drawing of an alternate embodiment of this invention.

It will be obvious to one skilled in the art that additional sets of four hubs and four shutter blades may be added to the apparatus shown in FIG. 7 in the manner described in the description of FIG. 8.

It will also be obvious to one skilled in the art that a plurality of hubs and shutters may be equidistantly positioned around other geometric figures i.e., pentagons, hexagons, heptagons, octagons, etc. while a belt is in contact with the hubs.

It will also be obvious to one skilled in the art that additional sets of n hubs and n shutter blades may be added to the various geometric shapes.

FIG. 8 is a drawing of an alternate embodiment of this invention. Two hubs that appear near location 70 of base 27 and two shutter blades that appear near location of 71 of base 27 are shown. For ease of illustration, two shutter blades which would respectively be connected to hubs 75 and 76 and two hubs which would respectively be connected to shutter blades 77 and 78 are not shown. The two shutter blades and two hubs that would be at location 72 are also not shown. Hub 75 has a smaller radius than hub 76. Thus, hub 75 contacts a smaller portion of belt 14 than hub 76. Hence, when belt 14 moves hub 75 will rotate more than hub 76. Therefore, the shutter blade that is connected to hub 75 will rotate faster than the shutter blade that is connected to hub 76. The manner in which six shutter blades are utilized is illustrated in this figure. It will be obvious to one skilled in the art that additional sets of hubs and shutter blades may be added to the apparatus shown in FIG. 8.

Figure 9:
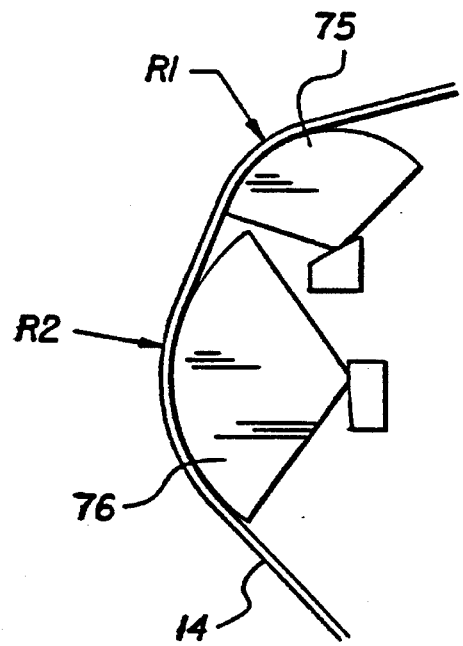
FIG. 9 is a an enlarged view of the hub portion of FIG. 8.

FIG. 9 is a an enlarged view of the hub portion of FIG. 8. Hub 75 has a radius R1 and hub 76 has a radius R2. Thus, hub 75 contacts a smaller portion of belt 14 than hub 76.

Figure 10:
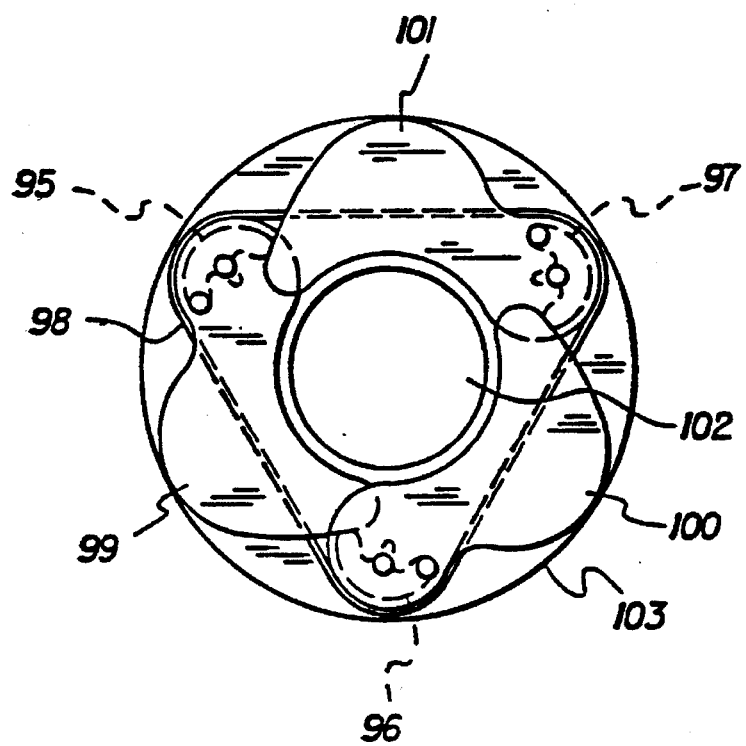
FIG. 10 is a drawing of a three blade belt driven shutter in the open state.
Figure 11:
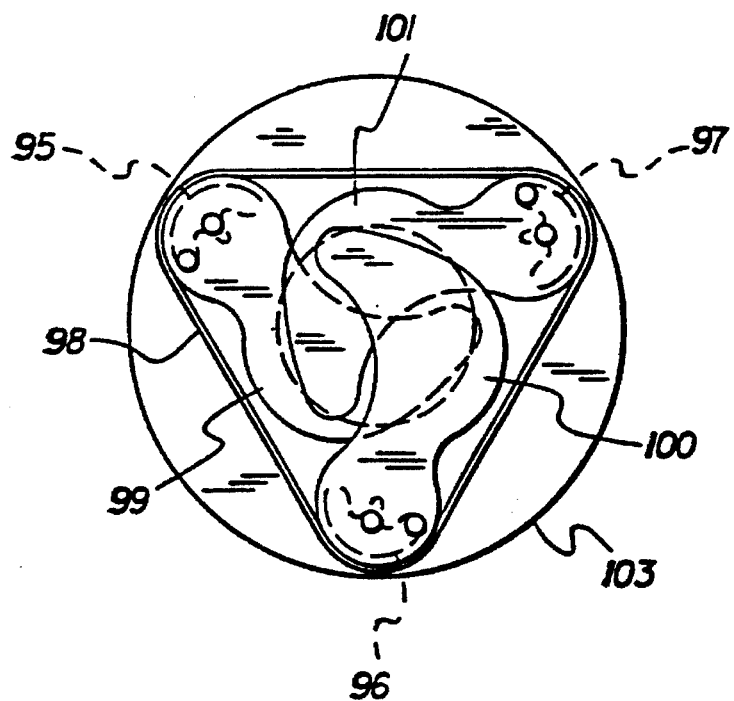
FIG. 11 is a drawing of the three blade belt driven shutter of FIG. 10 in the closed state.

FIG. 10 is a drawing of a three blade belt driven shutter in the open state and FIG. 11 is a drawing of a three blade belt driven shutter in the closed state. Hubs 95, 96 and 97 are positioned on the inside of a continuous belt 98. Hubs 95, 96 and 97 are spaced equidistant from each other forcing belt 98 to form a triangular shape. Belt 98 is respectively attached to hubs 95, 96 and 97 by any known means i.e., heat sealing, stapling, riveting, gluing, pinning, etc. For instance, belt 98 is shown attached to the center of hubs 95, 96 and 97 by pins (not shown). Shutter blade 99 is connected to hub 95 by locating pins (not shown) and shutter blade 100 is connected to hub 96 by locating pins (not shown). Shutter blade 101 is connected to hub 97 by locating pins (not shown). Hubs 95, 96 and 97 are connected to base 103. Shutter blades 99, 100 and 101 are shown in the full open position (FIG. 10) so that light may enter aperture 102 and shutter blades 99, 100 and 101 are shown in the closed position (FIG. 11) so that light may not enter aperture 102.

Figure 12:
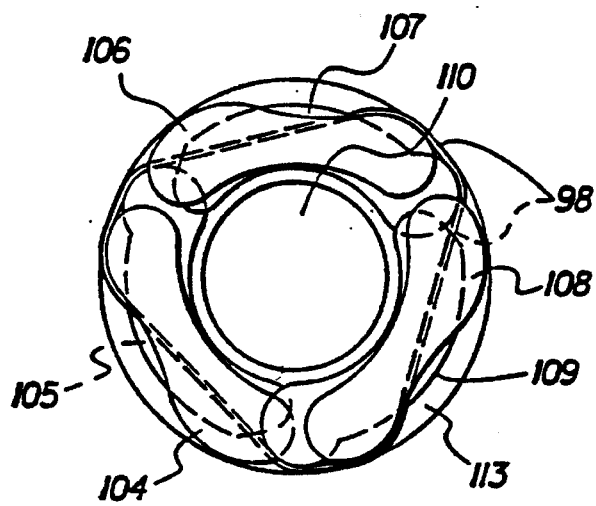
FIG. 12 is a drawing of an alternate embodiment of this invention.

FIG. 12 shows a redesigned shutter that uses a pair of hubs (not shown) and a pair of shutter blades to replace each blade and hub of the shutter shown in FIG. 10. The manner in which the shutters operate and are assembled is described in the description of FIG. 8. Shutter blade 104 is different from shutter blade 105 and shutter blade 106 is different from shutter blade 107. Shutter blade 108 is different from shutter blade 109. Belt 98 is wrapped around the hubs and shutter blades 104, 105, 106, 107, 108 and 109 form aperture 110. The aforementioned components rest on base 113. As described in the description of FIG. 8 and FIG. 9, the difference in the hubs is that one hub has a larger radius than the other hub. The discrepancy in the radii, causes the hub with the smaller radius to rotate faster than the hub with the larger radius. This in turn causes the shutter blade attached to the hub with the smaller radius to rotate faster and cover aperture 110 sooner. The hubs and shutter blades are designed so that when the faster rotating shutter blade has crossed the center of aperture 110, the other shutter blade of the shutter blade pair covers a gap between the first shutter blade of the pair and the outer edge of aperture 110.

Figure 13:
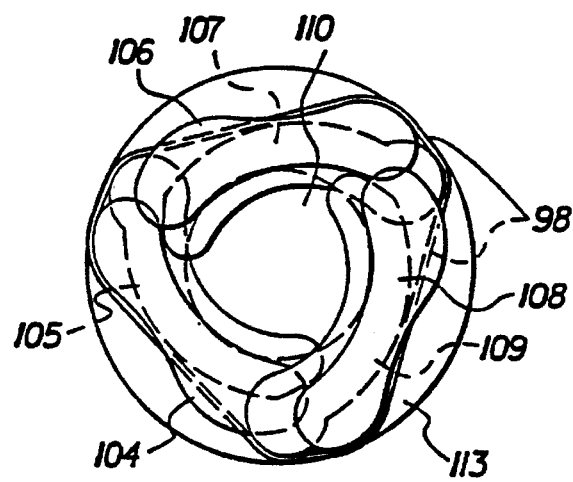
FIG. 13 is a drawing of the shutter shown in FIG. 10 when the shutter blades are ⅓ closed.

FIG. 13 is a drawing of the shutter shown in FIG. 10 when the shutter blades are ⅓ closed.

Figure 14:
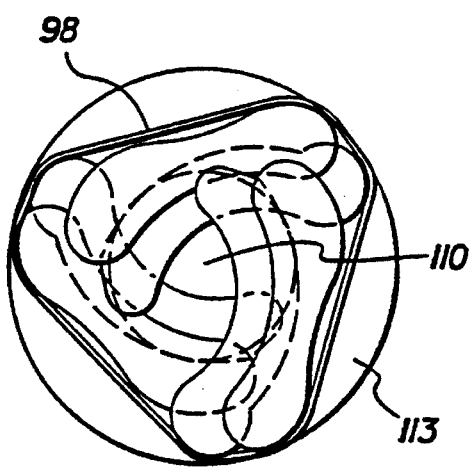
FIG. 14 is a drawing of the shutter shown in FIG. 10 when the shutter blades are ⅔ closed.

FIG. 14 is a drawing of the shutter shown in FIG. 10 when the shutter blades are ⅔ closed.

Figure 15:
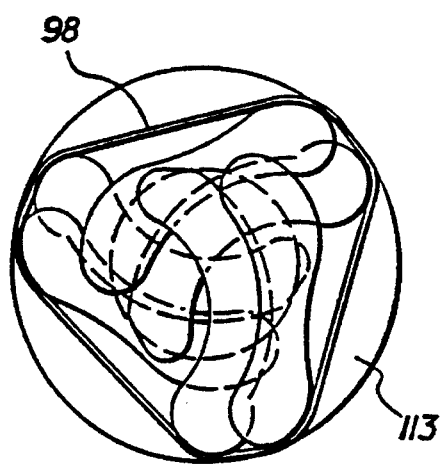
FIG. 15 is a drawing of the shutter shown in FIG. 10 when the shutter blades are completely closed.

FIG. 15 is a drawing of the shutter shown in FIG. 10 when the shutter blades are completely closed.

The benefit of the arrangement described in FIGS. 10–15 is that aperture 102 of FIG. 10 and aperture 110 of FIGS. 11–15 is the same size, while the outside dimensions of base 113 of FIGS. 12–15 is smaller than the outside dimension of base 103 of FIG. 10. An individual would want to make the largest aperture size out of the smallest shutter, by using two or more shutter blade hub pairs (each hub pair would have a different radius) in each corner of a geometric figure. This allows the size of the aperture to increase and the outside dimensions of the base to decrease. In fact the outer dimensions of base 113 of FIGS. 12–15 is 20% smaller than the outer dimension of base 103 of FIGS. 10 and 11, while aperture 102 of FIGS. 10 and 11 and aperture 110 of FIGS. 12–15 are the same size.

Figure 16:
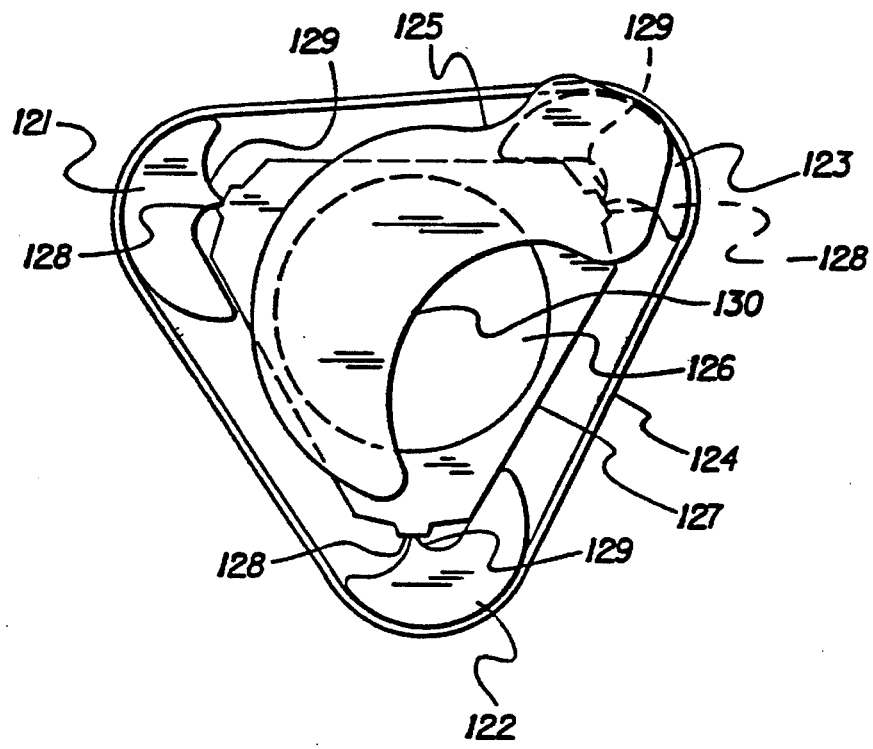
FIG. 16 is a drawing of an alternate embodiment of this invention in which three hubs are shown with a surrounding belt, their respective rolling surfaces, and one shutter blade.

FIG. 16 is a drawing of an alternate embodiment of this invention in which three hubs are shown with a surrounding belt, their respective rolling surfaces, and one shutter blade (for ease of illustration). Hubs 121, 122 and 123 are positioned on the inside of a continuous belt 124. Hubs 121, 122 and 123 are spaced equidistant from each other forcing belt 124 to form a triangular shape. Belt 124 is respectively attached to hubs 121, 122 and 123 by any known means i.e., heat sealing, stapling, riveting, gluing, pinning, etc. For instance, belt 124 is shown attached to the center of hubs 121, 122 and 123 by pins (not shown). Shutter blade 125 is connected to hub 123 by locating pins (not shown). Base 127 has rolling surfaces 128 and hubs 121, 122, and 123 have rolling surfaces 129. Light may enter aperture 126 along optical axis 130.

Figure 17:
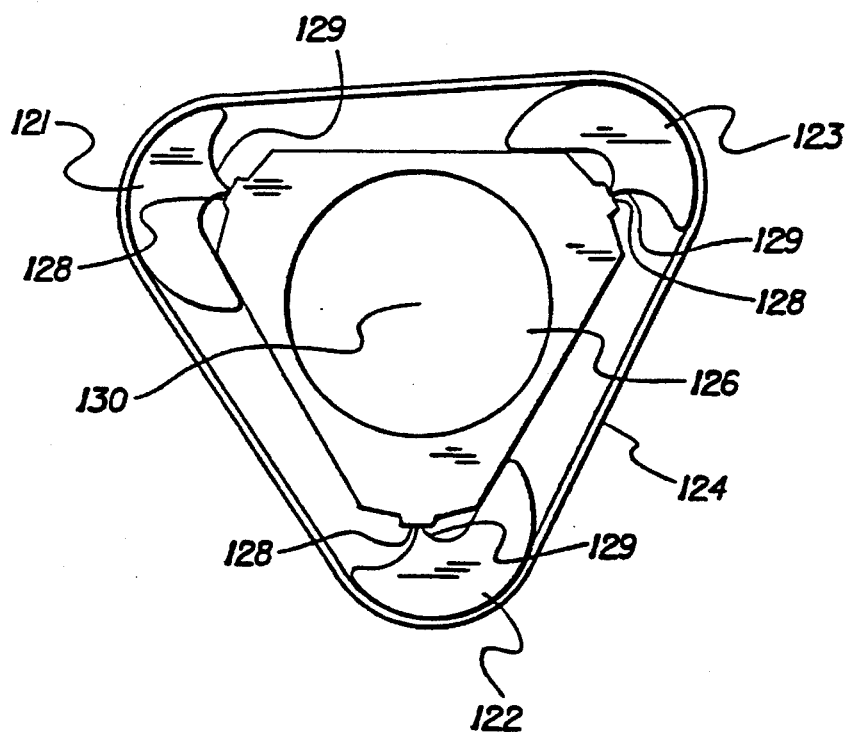
FIG. 17 is a drawing of FIG. 16 with the shutter blade of FIG. 16 removed.

FIG. 17 is a drawing of FIG. 16 with shutter blade 125 of FIG. 16 removed.

Figure 18:
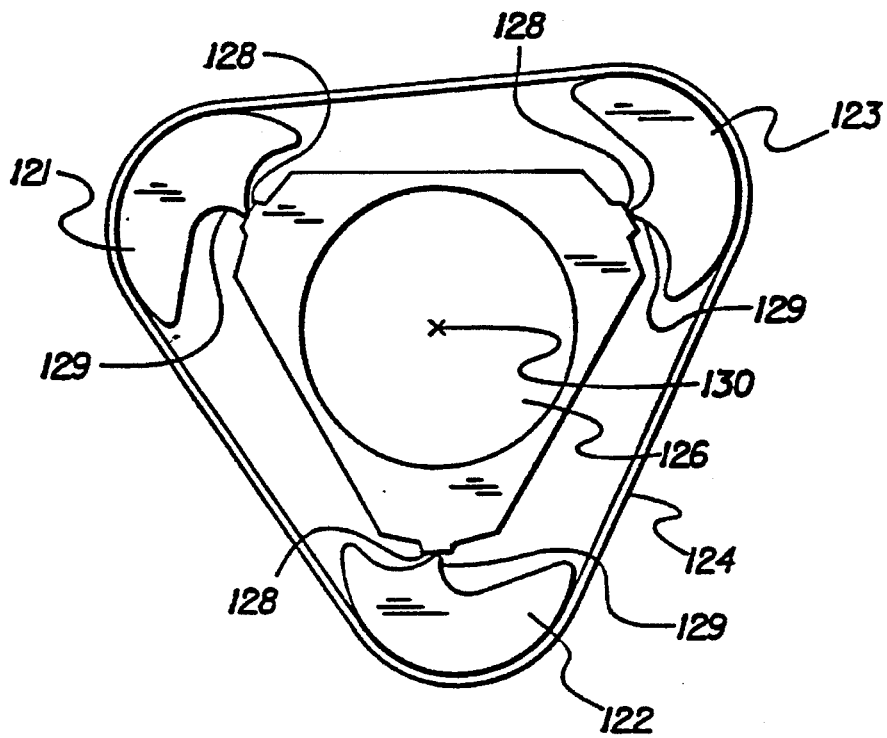
FIG. 18 is a drawing of FIG. 17 with the hubs rotated to the full open shutter position.

FIG. 18 is a drawing of FIG. 17 with hubs 121, 122 and 123 rotated to the full open shutter position.

It can be seen in FIGS. 16–18 that belt 124 may be used as a spring to return the shutter blades to their closed position. Belt 124 is being pulled away from optical axis 130 (FIG. 18) and is thus, being stretched. As long as the aforementioned stretching does not exceed the yield point of belt 124, belt 124 will spring back to its rest position and close the shutter blades (the position depicted in FIG. 15).

Figure 19:
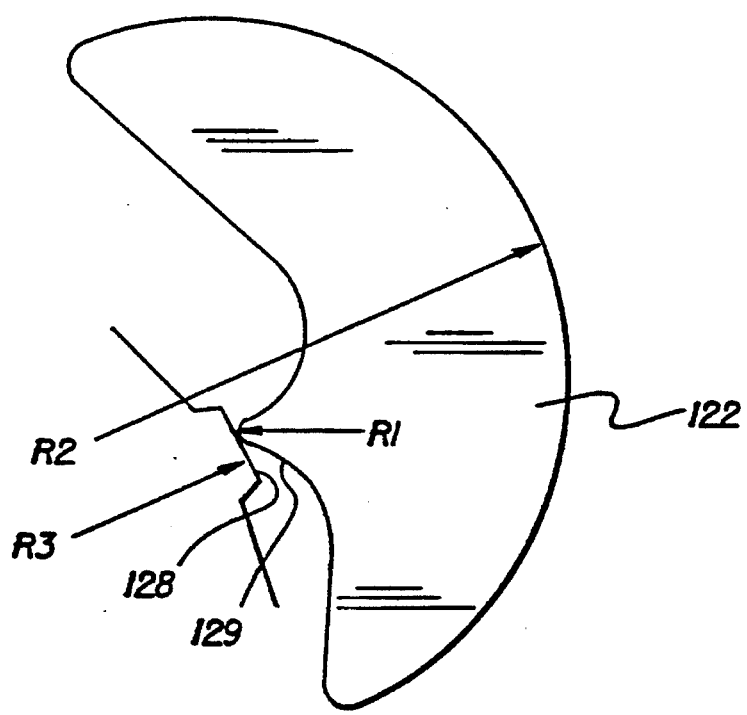
FIG. 19 is a drawing of an enlarged view of hub 122 and rolling surface 129 of base 127.

FIG. 19 is a drawing of an enlarged view of hub 122 and rolling surface 128 of base 127. The radius of rolling surface 128 is R3. It can be seen in FIG. 19, that the center of rolling surface 129 of hub 122 and the center of belt 124 supporting surface R2 of hub 122 are at different positions, like a cam. If the center of R2 was at the same position as rolling surface 129 of hub 122, then no caming action would occur. The radius center R2 is offset from R1 (the radius for rolling surface 129) in FIG. 19. Radius R3 of the rolling surface 128 has its center at the center of aperture 126 and this rolling surface mates with rolling surface R2. Thus, radius R2 stretches belt 124 as the shutter blades open making belt 124 function as a spring. When belt 124 is stretched it acts like a spring and returns the shutter blades to their original position. This eliminates the need for a separate part or the use of a motor or electromagnet to return the shutter blades to their original position and close the aperture. Hence, power may also be saved.

Belt driven multi-bladed shutters have a number of individual parts. These parts are: the shutter blades, the hubs which are attached to the shutter blades, the belt which interfaces with and actuates the hubs and the shutter blades and a base. For a multi-bladed shutter, the parts count for the above would be; (the number of blades)×2+2. So for a three bladed shutter, the parts count will be 8. A typical assembly method for a three bladed shutter would be to assembly a hub to a shutter blade, and assemble the hub/shutter blade to the base. Next the final two hubs would be assembled to their blades and then to the base. Finally the belt would be wrapped around the hubs and attached. Molding reduces the parts count for all multi-bladed shutters to one part. The assembly procedure only involves placing the single compound molded part onto the base of the shutter.

Figure 20:
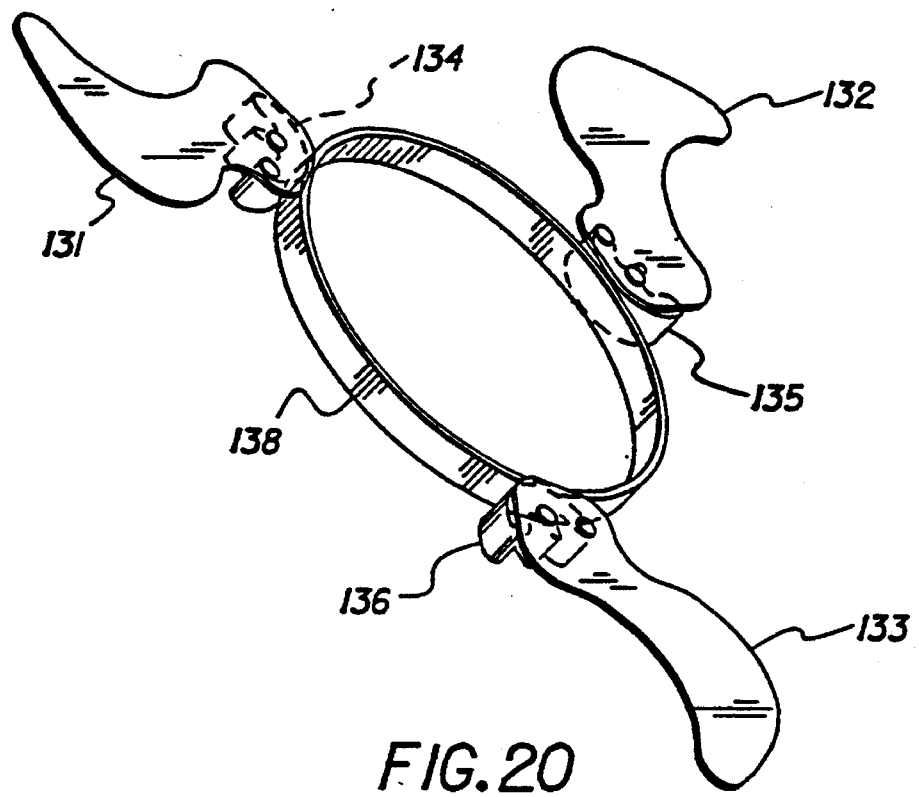
FIG. 20 is a perspective drawing of the apparatus of this invention as it would appear after molding.

FIG. 20 is a perspective drawing of the apparatus of this invention as it would appear after manufacture. In a belt drive multi-blade shuttering system, the principal components of the system are: shutter blades 131, 132 and 133; hubs 134, 135 and 136 to which the shutter blades are attached; and belt 138 which connects hubs 134, 135 and 136 together. Shutter blades 131, 132 and 133, hubs 134, 135 and 136 and belt 138 can be molded, casted, etc. inside out as one part by compression injection molding, or other similar molding technique known in the art, as one part. This eliminates the virtual contact between shutter blades 131, 132 and 133 and also eliminates the intimate contact of belt 138 to hubs 134, 135 and 136, thus avoiding knife edge mold features. Certain types of molding allows for parts to be molded down to thicknesses of 3 thousands of an inch.

Figure 21:
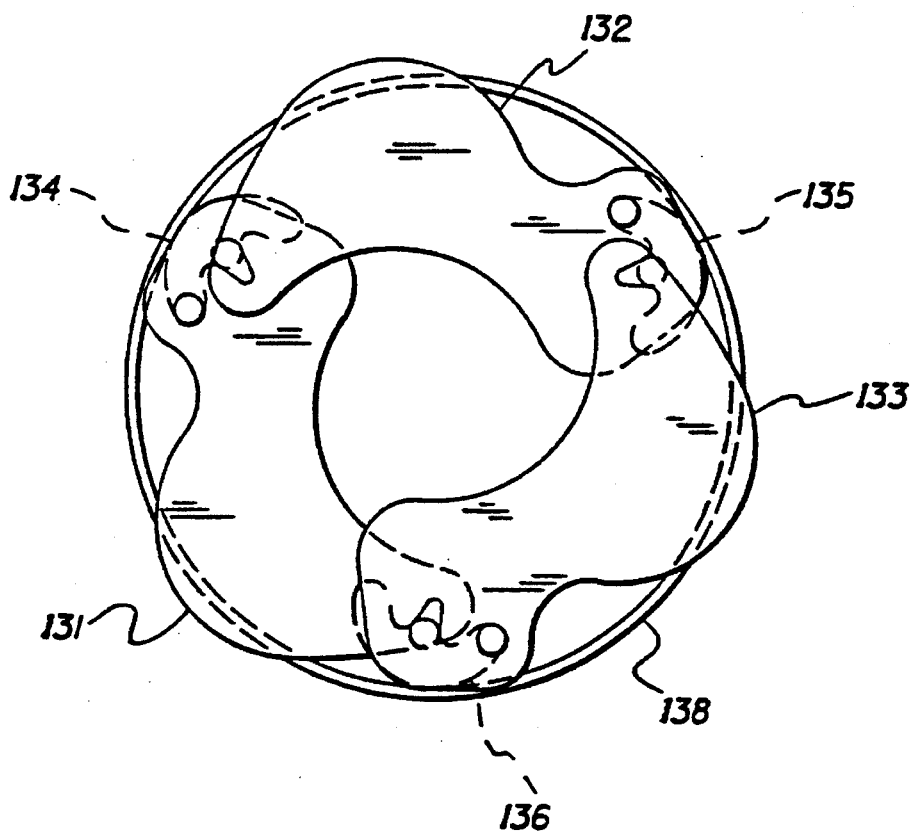
FIG. 21 is a drawing of FIG. 20 turned inside out prior to assembly to the base.
Figure 22:
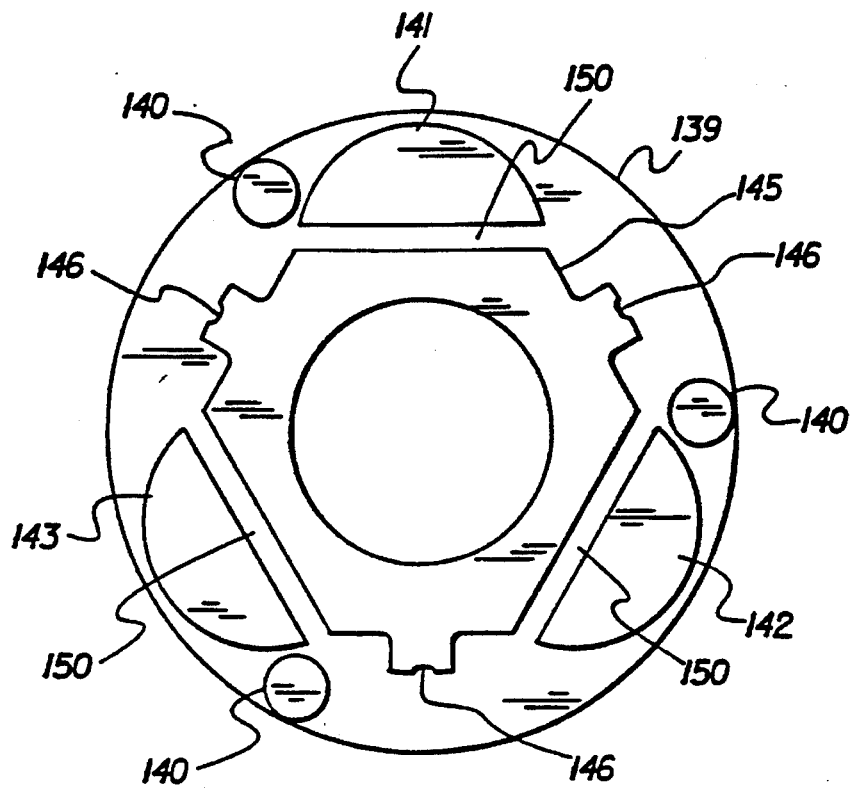
FIG. 22 is a drawing of the base.

FIG. 21 is a drawing of FIG. 20 turned inside out prior to assembly to base 139 (described in FIG. 22). This is accomplished by sequentially turning one blade inside from the outside and then the next blade, and then the next blade etc. then the blades will come in virtual contact with each other. Belt 138 will wrap itself around hubs 134, 135 and 136 for some angle around 20 degrees to be permanently attached to hubs 134, 135 and 136.

FIG. 22 is a drawing of base 139. Base 139 has mounting pins 140 equidistantly spaced, portions 141, 142 and 143 which help guide belt 138 (not shown) in gaps 150. Rolling surfaces 146 form a part of portion 145.

Figure 23:
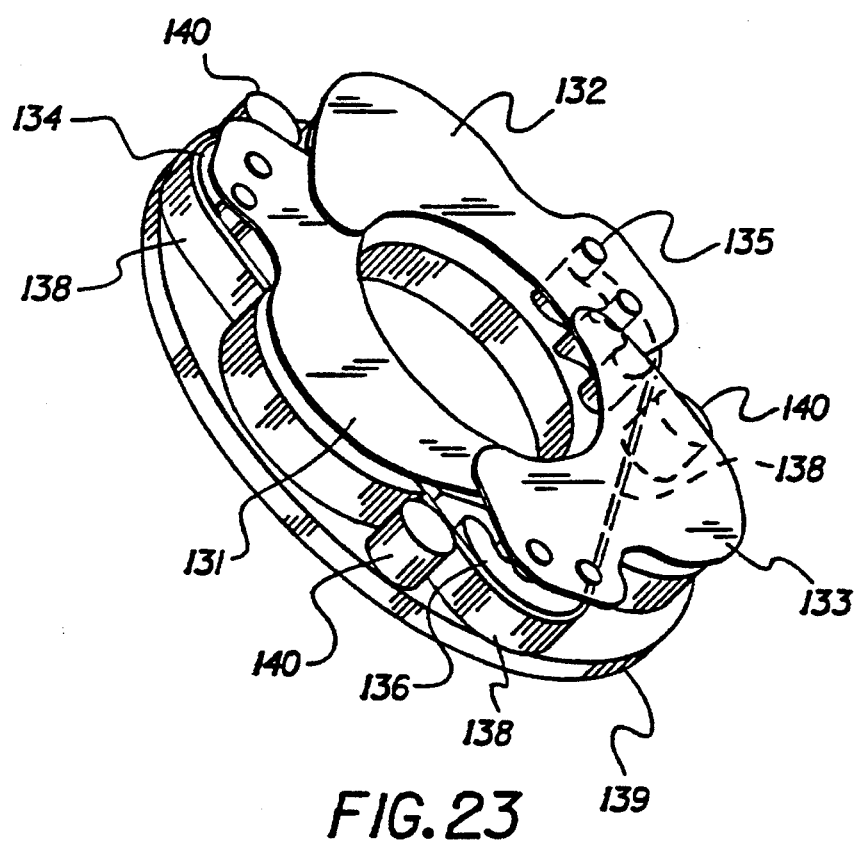
FIG. 23 is a perspective drawing of the apparatus of this invention assembled onto the base.

FIG. 23 is a perspective drawing of the apparatus of this invention showing shutter blades 134, 135 and 136, belt 138, hubs 134, 135 and 136 assembled to base 139.

Figure 24:
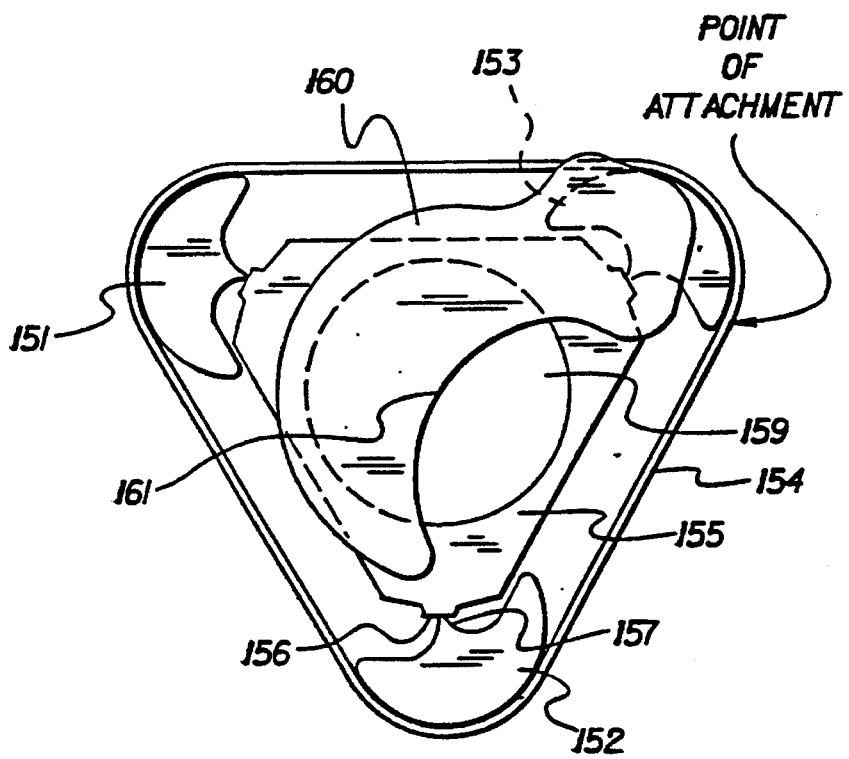
FIG. 24 is a drawing of an alternate embodiment of this invention in which three hubs are shown with a surrounding belt, their respective rolling surfaces, and one shutter blade.

FIG. 24 is a drawing of an alternate embodiment of this invention in which three hubs are shown with a surrounding belt, their respective rolling surfaces, and one shutter blade (for ease of illustration). Hubs 151, 152 and 153 are positioned on the inside of a continuous belt 154. Hubs 151, 152 and 153 are spaced equidistant from each other forcing belt 154 to form a triangular shape. Belt 154 is respectively attached to hubs 151, 152 and 153 by any known means i.e., heat sealing, stapling, riveting, gluing, pinning, etc. For instance, belt 154 is shown attached to the end of hubs 151, 152 and 153 by pins (not shown). Shutter blade 160 is connected to hub 153 by locating pins (not shown). Base 155 has rolling surfaces 156 and hubs 151, 152, and 153 have rolling surfaces 157. Light may enter aperture 159 along optical axis 161.

Figure 25:
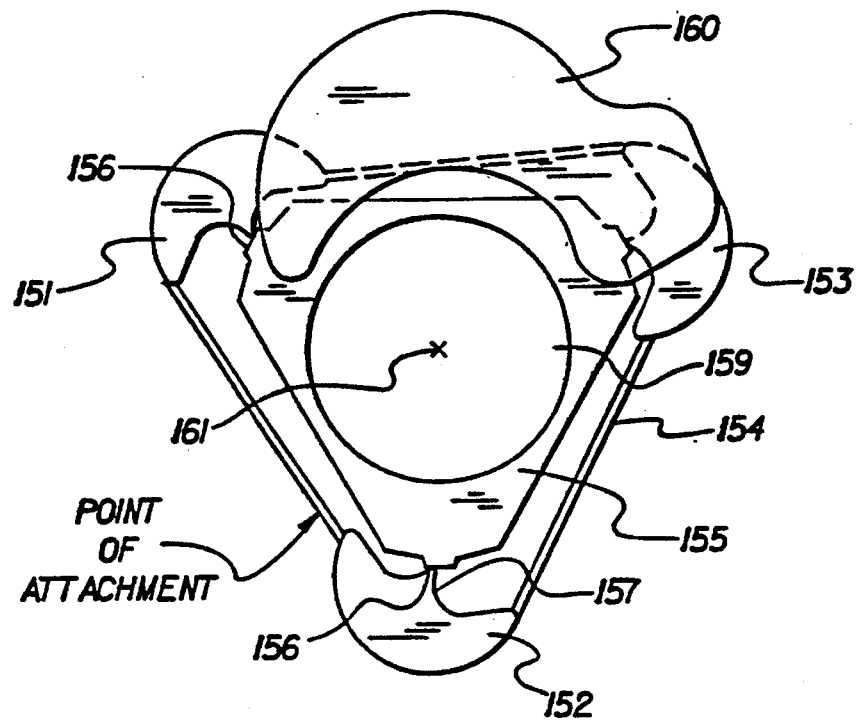
FIG. 25 is a drawing of FIG. 24 with the hubs rotated to the full open shutter position.

FIG. 25 is a drawing of FIG. 24 with hubs 151, 152 and 153 rotated to the full open shutter position.

It can be seen in FIGS. 24–25 that belt 154 may be used as a spring to return the shutter blades to their closed position. Belt 154 is not allowed to unwrap from the hub (FIG. 25) and is thus, being stretched. As long as the aforementioned stretching does not exceed the yield point of belt 154, belt 154 will spring back to its rest position and close the shutter blades.

The above specification describes a new and improved coupling mechanism for the individual blades of a leaf type camera shutter. It is realized that the above description may indicate to those skilled in the art additional ways in which the principles of this invention may be used without departing from the spirit. It is, therefore, intended that this invention be limited only by the scope of the appended claims.

| Parts List | | |
|---|---|---|
| hub 11 | hub 81 | rolling surfaces 128 |
| hub 12 | hub 82 | rolling surfaces 129 |
| hub 13 | hub 83 | optical axis 130 |
| belt 14 | belt 84 | shutter blade 131 |
| pins 15 | pins 85 | shutter blade 132 |
| shutter blade 16 | locating pins 87 | shutter blade 133 |
| shutter blade 17 | shutter blade 88 | hub 134 |
| shutter blade 18 | locating pins 89 | hub 135 |
| locating pins 19 | shutter blade 90 | hub 136 |
| locating pins 20 | locating pins 91 | belt 138 |
| locating pins 21 | shutter blade 92 | base 139 |
| aperture 23 | locating pins 93 | mounting pins 140 |
| base 27 | aperture 94 | portion 141 |
| mounting pins 28 | hub 95 | portion 142 |
| portion 31 | hub 96 | portion 143 |
| portion 32 | hub 97 | portion 145 |
| portion 33 | belt 98 | rolling surface 146 |
| portion 35 | shutter blade 99 | gaps 150 |
| holes 36 | shutter blade 100 | hub 151 |
| cover 40 | shutter blade 101 | hub 152 |
| holes 41 | aperture 102 | hub 153 |
| hole 42 | base 103 | belt 154 |
| magnet 50 | shutter blade 104 | base 155 |
| wall 51 | shutter blade 105 | rolling surfaces 156 |
| wall 52 | shutter blade 106 | rolling surfaces 157 |
| armature 60 | shutter blade 107 | aperture 159 |
| protrubance 61 | shutter blade 108 | shutter blade 160 |
| center point 62 | shutter blade 109 | optical axis 161 |
| line 65 | aperture 110 | |
| location 70 | base 113 | |
| location 71 | hub 121 | |
| hub 75 | hub 122 | |
| hub 76 | hub 123 | |
| shutter blade 76 | belt 124 | |
| shutter blade 77 | aperture 126 | |
| hub 80 | base 127 | |

What is claimed is:

1. A coupling device for controlling the shutter blades of a shutter, that are positioned in the proximity of a base and actuated by an actuating mechanism, said device characterized by:

two or more hubs that are each individually attached to one of the shutter blades such that no relative movement is allowed between each hub and its attached shutter blade, each of said hubs rolling on a different portion of the base; and a belt for coupling said hubs to each other so that when one of said hubs rolls along a portion of the base and moves one of the shutter blades, said remaining hubs move the remaining shutter blades.

2. The device claimed in claim 1, wherein said belt is physically connected to a portion of one or more of said hubs to prevent slippage of said belt.

3. The device claimed in claim 1, wherein said belt is physically connected to a portion of one or more of said hubs to prevent unwrapping of said belt.

4. The device claimed in claim 1, wherein said hubs are spaced equidistant from each other.

5. The device claimed in claim 1, wherein said one or more hubs comprises:

a first surface that is in contact with said belt means to supply tension to said belt means; and a second surface that engages the base and rolls along a portion of the base.

6. The device claimed in claim 5, wherein said hubs rotate in a first direction or in a second direction so that a portion of said coupling means will be unwrapped from said hubs and an equal portion of said coupling means will be wrapped around said hubs.

7. The device claimed in claim 5, wherein said first surface is an arc in which a portion of said arc is always in contact with said belt.

8. The device claimed in claim 5, wherein said second surface comprises:

a member having one end that is connected to said hub and another end that rolls along a portion of the base.

9. The device claimed in claim 5, wherein a portion of said belt is secured to said first surface of at least one of said hubs such that when said hubs are rotated in a first direction, more of said belt will be wrapped around said first surface than will be unwrapped from said first surface, such that said belt acts as a spring to rotate said hubs in a second direction.

10. The device claimed in claim 1, wherein said hubs rotate in a first direction to open the shutter blades and in a second direction to close the shutter blades.

11. A method of manufacturing a coupling device for controlling the shutter blades of a leaf type shutter, that comprises the steps of:

forming a plurality of shutter blades that have a raised surface in a manner that the shutter blades point away from each other and are connected to the raised surface by a continuous band;

sequentially turning each of the shutter blades so that each of the shutter blades will come into virtual contact with each other and the continuous band will be in contact with a portion of the raised surface; an assembling the shutter blades to a base so that each of the raised surfaces will be in rolling contact with a portion of the base allowing the shutter blades to open when the hubs are rotated in a first direction and allowing the shutter blades to close when the hubs are rotated in a second direction.

12. A coupling device for controlling the shutter blades of a shutter, that are positioned in the proximity of a base and actuated by an actuating mechanism, said device characterized by:

a first plurality of hubs that are equidistantly spaced around the base wherein each of said hubs rolls on a different portion of the base;

a second plurality of hubs that are equidistantly spaced around the base in close proximity to said first plurality of hubs, each of said hubs being attached to a corresponding shutter blade; and a belt for coupling said first and second plurality of hubs to each other so that when one of said hubs rolls along a portion of the base and moves one of the shutter blades, said remaining hubs move the remaining shutter blades.

13. The device claimed in claim 12, wherein said first plurality of hubs comprises:

a first surface that is in contact with said belt to supply tension to said belt; and a second surface that engages the base and rolls along a portion of the base.

14. The device claimed in claim 13, wherein said second plurality of hubs comprises:

a first surface that is in contact with said coupling means to supply tension to said coupling means; and a second surface that engages the base and rolls along a portion of the base.

15. The device claimed in claim 14 wherein said first surface of said first plurality of hubs is in contact with said belt for a shorter distance than said first surface of said second plurality of hubs so that the shutter blades that are connected to said first plurality of hubs will move faster than the shutter blades that are connected to said second plurality of hubs.

16. The device claimed in claim 15, wherein the difference in speeds of the shutter blades that are connected to said first and second plurality of hubs permit the faster rotating shutter blades to cross the center of the aperture while the slower moving shutter blades cover a gap between the faster moving shutter blades and the outer edge of the aperture permitting the outside dimensions of the base to remain the same when larger size apertures are designed.

17. The device claimed in claim 1, wherein said hubs are shaped such that when said hubs are rolled in a first direction, said belt is moved away from said base to store tension energy in said belt, said tension energy being utilized to roll said hubs in a second direction.

* * * * *

UNITED STATES PATENT AND TRADEMARK OFFICE
CERTIFICATE OF CORRECTION

PATENT NO. : 5,534,961
DATED : July 9, 1996
INVENTOR(S) : David R. Dowe, et al

It is certified that error appears in the above-identified patent and that said Letters Patent is hereby corrected as shown below:

Column 9, claim 6, line 65     delete "coupling means" and insert --belt--

Column 9, claim 6, line 66     delete "coupling means" and insert --belt--

Column 10, claim 11, line 27   delete "an" and insert --and--

Col. 10, claim 14, line 60     delete "coupling means" and insert --belt--

Col. 10, claim 14, line 61     delete "coupling means" and insert --belt--

Signed and Sealed this

Fourteenth Day of April, 1998

Attest:

BRUCE LEHMAN

*Attesting Officer*       *Commissioner of Patents and Trademarks*